No. 801,153. PATENTED OCT. 3, 1905.
E. J. NEWTON.
ROD PACKING.
APPLICATION FILED JAN. 16, 1905.
2 SHEETS—SHEET 1.
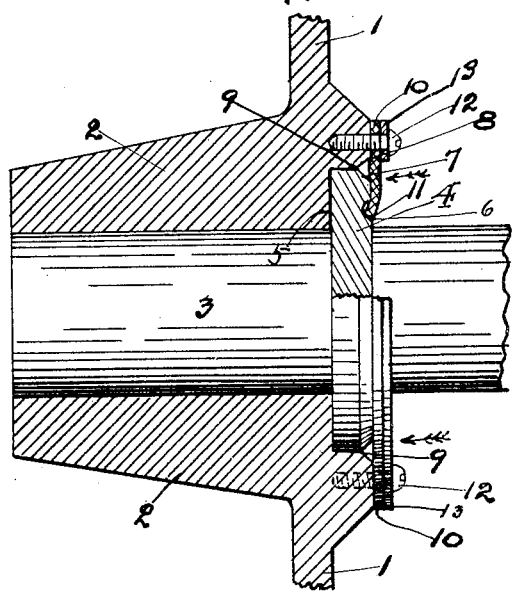
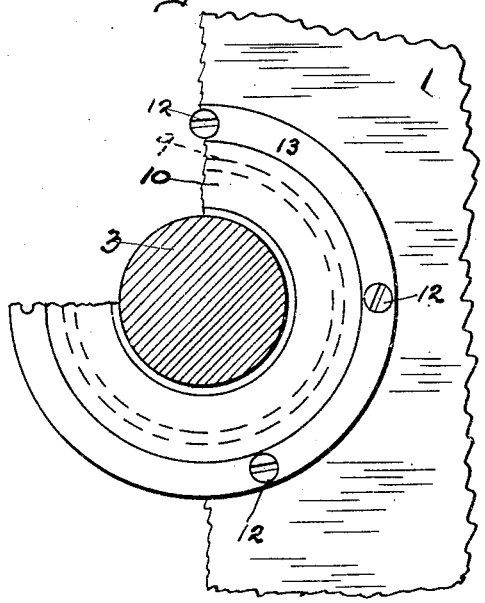
WITNESSES:
INVENTOR
Edwin J. Newton
BY Harry Lea Dodds
ATTORNEY.

No. 801,153. PATENTED OCT. 3, 1905.
E. J. NEWTON.
ROD PACKING.
APPLICATION FILED JAN. 16, 1905.
2 SHEETS—SHEET 2.
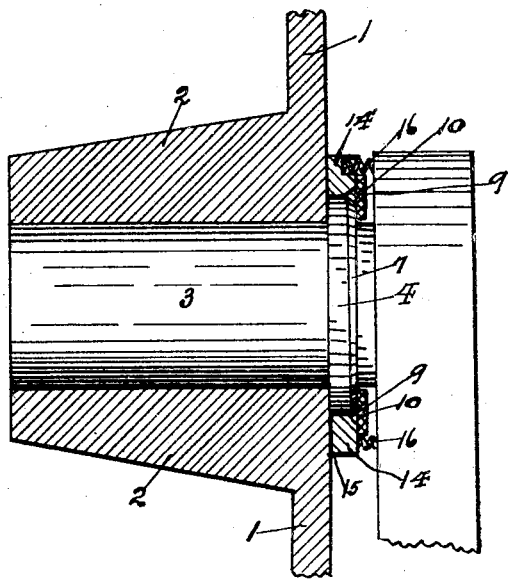
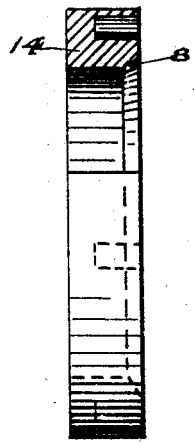
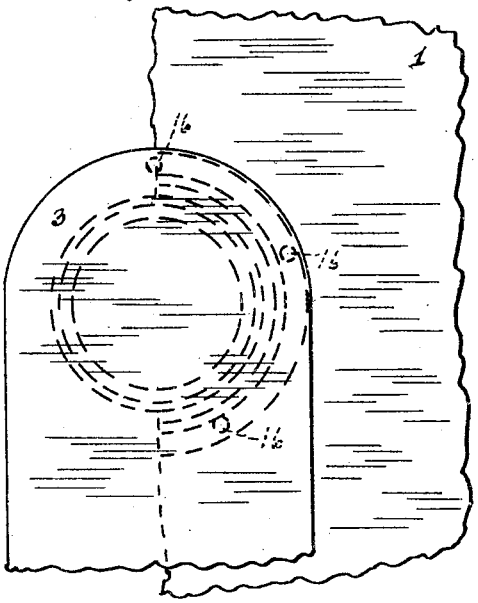
WITNESSES:
C. M. Burnam
J. W. Carroll
INVENTOR.
Edwin J. Newton
By Harry Lea Dodson
ATTORNEY.

UNITED STATES PATENT OFFICE.

EDWIN J. NEWTON, OF CHICAGO, ILLINOIS.

ROD-PACKING.

No. 801,153.    Specification of Letters Patent.    Patented Oct. 3, 1905.

Application filed January 16, 1905. Serial No. 241,170.

*To all whom it may concern:*

Be it known that I, EDWIN J. NEWTON, a citizen of the United States, residing at Chicago, in the county of Cook and State of Illinois, have invented certain new and useful Improvements in Rod-Packing, of which the following is a specification.

My invention relates to that class of engines wherein the crank-case is used as a compression-chamber, and has for its object to prevent the escape of the fluid-pressure from the interior of the case when the pressure is raised and to accomplish this result in a manner which will not only be inexpensive, but will reduce the friction to a minimum. My method of accomplishing this result may be more readily understood by having reference to the accompanying drawings, which are a part of this specification and are hereunto annexed, in which—

Figure 1 is a view of a part of a crank-case, showing my improved device applied to the crank. Fig. 2 is an end view of the same. Fig. 3 shows a modified form of my invention. Fig. 4 is an end view of the same. Fig. 5 is a detail view.

Similar figures refer to similar parts throughout the entire description.

In the drawings, 1 is the wall of the crank-case.

2 is a crank-bearing.

3 is the crank, which is formed with a shoulder 4, fitting to and coinciding with a recess 5, formed or turned in the inner wall of the bearing 2, although it may be found desirable in practice to make this shoulder 4 of a separate ring instead of having it integral with the crank, in which event it may be secured to the crank by means of any of the usual methods employed in such cases. The inner face of the shoulder or ring 4 has a recess which is turned thereon, the corner 7 and the corresponding corner 8 on the recess being cut away, so as to form a V-shaped recess 9. A washer 10 is cut from some flexible material, preferably rawhide, its inner edge 11 extending almost to the crank 3. This rawhide washer 10 is secured in place by means of screws 12, which are threaded into the bearing 2, a metal ring 13 being provided to insure a firm hold upon the rawhide washer.

The action of the device is as follows: When the pressure is raised, it presses against the inner face of the rawhide washer in the direction indicated by the arrows. The result is the washer is depressed and fills the recesses 6 and 9, it being obvious that the higher the pressure is raised the tighter this washer, which acts as a valve, will seat itself. At the same time the fact that it is constructed of a flexible material permits the crank to move laterally in the bearing without permitting any leakage of the pressure.

Another or modified form of my invention is shown in Figs. 3 and 4, in which a metal ring 14 is shown surrounding the shoulder 4, one of its faces 15 bearing against the inner wall of the crank-case. This ring turns with the crank, but is movable laterally thereon. Coil-springs 16 are placed at suitable intervals and exert a tension which holds the face 15 of the ring 14 against the inner wall of the crank-case, insuring a tight joint at this point; but there is a decided tendency to leakage through the joint between the crank or shoulder thereon and the inner surface of the ring 14, due to the fact that it has to be constructed with sufficient looseness in order to permit of the lateral movement of the crank. This is overcome by means of the rawhide washer 10, which is fitted and arranged to be held against the ring 14 and the shoulder or crank, it being obvious that the higher the pressure is raised in the crank the tighter this washer will seat itself in the recess 9, formed between the shoulder 4 and the ring 14.

Other modifications may suggest themselves to persons skilled in the art by which my invention may be adapted to various styles of engines which will not deviate essentially from my invention, the essential feature of which is the providing of a washer of flexible material to close the opening between the crank and the bearing which shall be seated by the pressure in the crank-case.

Having described my invention, what I regard as new, and desire to secure by Letters Patent, is—

1. In a gas-engine, the combination of a crank-case with a crank journaled in a bearing in the wall of said crank-case, said crank having a shoulder formed thereon fitted to and coinciding with a recess in the inner face of said bearing, a V-shaped recess formed at the junction of the said shoulder and the said recess, a washer of flexible material covering said V-shaped recess, means to secure and hold said washer in position, for the purpose set forth substantially as described.

2. In a gas-engine, the combination of a crank-case with a crank journaled in the wall of said crank-case, a ring mounted upon said crank and forming a shoulder thereon, said ring fitted to, and coinciding with a recess turned in the inner face of said bearing, a recess formed at the junction of said ring and said bearing, a washer of flexible material covering said recess, means to secure and hold said washer in position, for the purpose set forth substantially as described.

3. In a gas-engine, the combination of a crank-case with a crank journaled in a bearing in the wall of said crank-case, said crank having a shoulder formed thereon fitted to and coinciding with a recess in the inner face of said bearing, a V-shaped recess formed at the junction of the said shoulder and the said recess, said shoulder having a recess formed upon its inner surface, a washer of flexible material covering said V-shaped recess, means to secure and hold said washer in position, for the purpose set forth substantially as described.

4. In a gas-engine, the combination of a crank-case with a crank journaled in a bearing in the wall of said crank-case, said crank having a shoulder formed thereon fitted to and coinciding with a recess in the inner face of said bearing, a V-shaped recess formed at the junction of the said shoulder and the said recess, said shoulder having a recess formed upon its inner surface, a washer of flexible material covering said V-shaped recess, said washer being held in position by a metal ring which is secured in place by screws threaded into the crank-case, for the purpose set forth substantially as described.

5. In a gas-engine, the combination of a crank-case with a crank journaled in the wall of said crank-case, a ring mounted upon said crank and forming a shoulder thereon, said ring fitted to and coinciding with a recess turned in the inner face of said bearing, a recess formed at the junction of said ring and said bearing, said shoulder having a recess upon its inner face, a washer of flexible material covering said recess, means to secure and hold said washer in position, for the purpose set forth substantially as described.

6. In a gas-engine, the combination of a crank-case with a crank journaled in the wall of said crank-case, a ring mounted upon said crank and forming a shoulder thereon, said ring fitted to and coinciding with a recess turned in the inner face of said bearing, a recess formed at the junction of said ring and said bearing, said shoulder having a recess upon its inner face, a washer of flexible material covering said recess, said washer being held in position by a metal ring which is secured in place by screws threaded into the crank-case, for the purpose set forth substantially as described.

7. In a gas-engine, the combination of a crank-case with a crank journaled in a bearing in the wall of said crank-case, said crank having a shoulder formed by a ring mounted upon said crank, said shoulder fitted to and coinciding with a recess in the inner face of said bearing, a V-shaped recess formed at the junction of said shoulder and said recess, said shoulder having a recess formed upon its inner surface, a washer of flexible material covering said recess, means to secure and hold said washer in position, for the purpose set forth substantially as described.

8. In a gas-engine, the combination of a crank-case with a crank journaled in a bearing in the wall of said crank-case, said crank having a shoulder formed by a ring mounted thereon, means to secure and hold said ring in position, said shoulder fitted to and coinciding with a recess in the inner face of said bearing, a V-shaped recess formed at the junction of said shoulder and said recess, said shoulder having a recess formed upon its inner surface, a washer of flexible material covering said recess, said washer being held in position by a metal ring which is secured in place by screws threaded into the crank-case, for the purpose set forth substantially as described.

9. In a gas-engine, the combination of a crank-case having a crank journaled in a bearing in the walls thereof, a shoulder formed on said crank, a metal ring mounted upon said shoulder, one side of which bears against the inner face of the wall of the crank-case, spring-actuated means to secure and hold said ring against said wall to permit a lateral movement of the crank, a recess formed at the junction of said ring and said shoulder, a washer of flexible material covering said recess, for the purpose set forth substantially as described.

10. In a gas-engine, the combination of a crank-case having a crank journaled in a bearing in the walls thereof, a shoulder formed on said crank, a metal ring mounted upon said shoulder, one side of which bears against the inner face of the wall of the crank-case, a plurality of coil-springs holding said ring yieldingly against the inner face of the crank-case, a recess formed at the junction of said ring and said shoulder, a washer of flexible material covering said recess, for the purpose set forth substantially as described.

EDWIN J. NEWTON.

Witnesses:
H. L. DODSON,
J. H. CARROLL.